United States Patent [19]  [11] 4,390,682
Kyo et al.  [45] Jun. 28, 1983

[54] AROMATIC COPOLYESTER

[75] Inventors: Kayomon Kyo, Kyoto; Yasuhiko Asai, Uji; Isamu Hirose, Kyoto; Nobuo Suyama, Uji, all of Japan

[73] Assignee: Unitika Ltd., Hyogo, Japan

[21] Appl. No.: 308,646

[22] Filed: Oct. 5, 1981

Related U.S. Application Data

[63] Continuation of Ser. No. 88,313, Oct. 25, 1979, abandoned.

[30] Foreign Application Priority Data

Oct. 25, 1978 [JP] Japan ................. 53-132010

[51] Int. Cl.³ .............................. C08G 63/18
[52] U.S. Cl. ............................ 528/194; 525/141; 525/142; 525/143; 525/144; 525/145; 525/150; 525/151; 528/126; 528/128; 528/173; 528/191; 523/193; 523/271
[58] Field of Search .............. 528/126, 128, 173, 193, 528/194, 271, 191

[56] References Cited

U.S. PATENT DOCUMENTS 3,133,898  5/1964  Keck .................... 528/194
3,884,990  5/1975  Sakata et al. .......... 528/437
4,166,899  9/1979  Marayama et al. ........ 528/194

FOREIGN PATENT DOCUMENTS 49-113848  3/1973  Japan .................. 528/194
49-129792  4/1973  Japan .................. 528/194
51-23595   8/1974  Japan .................. 528/194
51-84892   1/1975  Japan .................. 528/194
51-103193  3/1975  Japan .................. 528/194

Primary Examiner—Lester L. Lee
Attorney, Agent, or Firm—Sughrue, Mion, Zinn, Macpeak & Seas

[57] ABSTRACT

An aromatic polyester copolymer consisting of 10 to 90 mol % of a recurring unit of the formula:

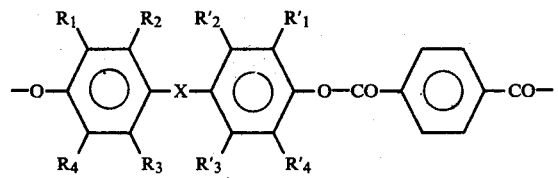

and 90 to 10 mol % of a recurring unit of the formula:

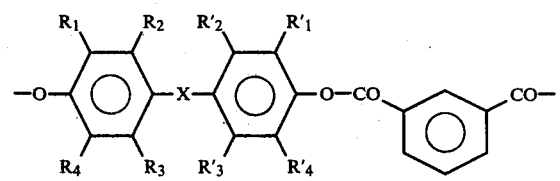

and having a logarithmic viscosity number of at least 0.3 as measured in a mixture of phenol and tetrachloroethane (6:4 in weight ratio) at a concentration of 1 g/100 cc at 25° C. and having a terminal carboxyl content of about 80 mol eq./ton or less. This aromatic polyester copolymer has high durability under dry and moist heat as well as high resistance to water crazing and hence can be fabricated into useful articles by various molding techniques.

12 Claims, No Drawings

AROMATIC COPOLYESTER

This is a continuation of application Ser. No. 88,313, filed Oct. 25, 1979 now abandoned.

BACKGROUND OF THE INVENTION

1. Field of the Invention

This invention relates to an aromatic polyester copolymer with improved stability and, more particularly, to an aromatic polyester copolymer with improved durability to aging under dry and moist heat (hereunder referred to as durability under dry and moist heat) as well as improved resistance to water crazing (hereunder crazing resistance).

2. Description of the Prior Art

Aromatic polyester copolymers comprising a mixture of terephthalic acid and isophthalic acid or functional derivatives thereof (the molar ratio of terephthalic acid to isophthalic acid being 9:1 to 1:9) and a bisphenol have been known for many years. Such aromatic polyesters are produced by "interfacial polymerization" wherein an aqueous alkali solution of a bisphenol is mixed with an aromatic dicarboxylic acid chloride dissolved in an organic solvent immiscible with water (W. M. Earechson, *J. Poly. Sci.*, 40 399 (1959) and Japanese Patent Publication No. 1959/65), "solution polymerization" wherein a mixture of a bisphenol and acid chloride is heated in an organic solvent (A. Conix, *Ind. Eng. Chem.*, 51 147 (1959) and U.S. Pat. No. 3,133,898), "melt polymerization" wherein a mixture of a phenyl ester of an aromatic dicarboxylic acid and bisphenol is heated (British Pat. No. 924,607 and U.S. Pat. No. 3,399,170), and other methods. According to one example of the interfacial polymerization which is a typical polymerization method, a solution of a mixture of terephthaloyl dichloride and isophthaloyl dichloride in methylene chloride is mixed with an aqueous solution of bisphenol A in caustic soda and polymerized under stirring at 5° to 25° C. for about 5 minutes to 3 hours. The resulting aromatic polyester copolymer usually contains at least about 100 mol eq./ton of the terminal carboxyl.

It is also well known that the aromatic polyester copolymer thus-prepared from aromatic dicarboxylic acids and bisphenols is superior to the polyester comprising aromatic dicarboxylic acids and aliphatic alkylene glycol with respect to mechanical properties such as tensile strength and elongation, flexural strength, bend recovery, and impact strength, physical properties such as thermal distortion temperature and dimensional stability, electrical properties and fire retardancy. Therefore, the aromatic polyester copolymer is used in various fields as articles fabricated by extrusion molding, injection molding and other molding methods, films, fibers, and coating materials. The advantages of such aromatic polyester over the polyethylene terephthalate and polybutylene terephthalate are its transparency, a high thermal distortion temperature (160° to 180° C.) and high fire retardancy. The aromatic polyester copolymer finds much utility where high temperature atmosphere under dry heat or moist heat is predominant.

However, one of the problems with such an aromatic polyester copolymer is that if it is exposed to high temperature atmosphere under dry or moist heat for an extended period, it discolors or its mechanical characteristics are impaired. Another problem that is observed is that if it is placed in hot water, like polycarbonate, the copolymer undergoes crazing wherein fine voids are formed inside of the copolymer which render it opaque and impair its mechanical characteristics.

Heretofore, many methods have been proposed to solve these problems. For example, a method involving mixing and melting polyethylene terephthalate with the aromatic copolyester (e.g., as described in U.S. Pat. No. 3,946,091), a method comprising mixing and melting polyethylene hydroxybenzoate with the aromatic copolyester (e.g., as described in U.S. Pat. No. 3,884,990), a method involving mixing and melting polybutylene terephthalate with the aromatic copolyester (e.g., as described in Japanese patent application (OPI) No. 34342/76 (The term "OPI" as used herein refers to a "published unexamined Japanese patent application")), a method comprising mixing and melting an organic phosphite ester with the aromatic copolyester (e.g., as described in U.S. Pat. No. 4,097,431), a method comprising mixing and melting an organic phosphate with the aromatic copolyester (e.g., as described in U.S. Pat. No. 4,123,420) and a method comprising mixing and melting an epoxy compound with an aromatic copolyester, are known.

Although the addition of polyethylene terephthalate, polyethylene hydroxybenzoate or polybutylene terephthalate is effective for providing improved crazing resistance, it is prone to reduce the inherent high fire retardancy of the aromatic polyester copolymer, and it has little effect to improve the durability under dry and moist heat. The addition of a phosphorous compound, in many cases, decreases the inherent high fire retardancy of the aromatic polyester copolymer, lowers the transparency of the copolymer due to its poor miscibility with the phosphorous compound, and what is more, the addition is not much effective to improve the durability under dry and moist heat or crazing resistance. Some of the epoxy compounds are effective to some extent in improving the durability of the copolymer under dry and moist heat, but they are not fully effective for providing improved crazing resistance and other than that, they have a strong tendency to accelerate coloring of the aromatic polyester copolymer during melt molding, thus reducing its commercial value considerably.

SUMMARY OF THE INVENTION

A first object of this invention is to improve the crazing resistance of aromatic polyester copolymer.

Another object of this invention is to improve the durability of aromatic polyester copolymer under dry and moist heat.

A further object of this invention is to provide aromatic polyester copolymer having improved durability under dry and moist heat and crazing resistance which can be used for the production of various fabricated articles such as injection-molded articles, monofilaments and films.

These and other objects of the invention will become apparent from the following detailed description of the invention.

As a result of investigations to improve the crazing resistance and durability under dry and moist heat of aromatic copolyesters derived from terephthalic acid, isophthalic acid and a bisphenol without impairing the inherent superior fire retardancy, high heat distortion temperatures and transparency of aromatic copolyesters, it has been found that these objects can be attained by keeping the terminal carboxyl content below a predetermined level. Therefore, this invention provides an aromatic polyester copolymer consisting of about 10 to about 90 mol% of a recurring unit of the formula (a):

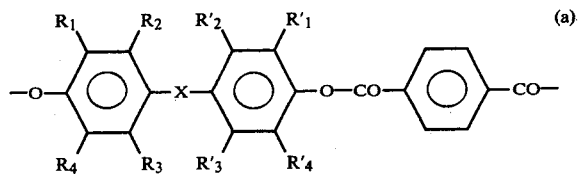

wherein —X— is selected from the group consisting of —O—, —S—, —SO$_2$—, —SO—, —CO—, an alkylene group containing 1 to 4 carbon atoms and an alkylidene group containing 1 to 4 carbon atoms; and R$_1$, R$_2$, R$_3$, R$_4$, R'$_1$, R'$_2$, R'$_3$ and R'$_4$, which may be the same or different, each represents a member selected from the group consisting of a hydrogen atom, a chlorine atom, a bromine atom and an alkyl group containing 1 to 4 carbon atoms; and about 90 to about 10 mol% of a recurring unit of the formula (b):

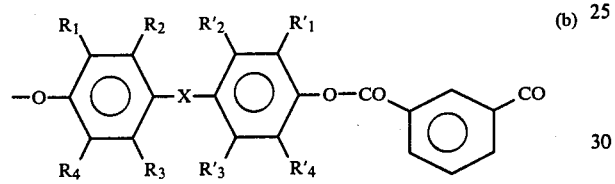

wherein —X—, R$_1$, R$_2$, R$_3$, R$_4$, R'$_1$, R'$_2$, R'$_3$, and R'$_4$ have the definition in formula (a); and having a logarithmic viscosity number of at least about 0.3 as measured in a mixture of phenol and tetrachloroethane (6:4 in weight ratio) at a concentration of 1 g/100 cc at 25° C. and a terminal carboxyl content of about 80 mol eq./ton or less.

DETAILED DESCRIPTION OF THE INVENTION

The aromatic polyester copolymer of this invention is high in mechanical properties, physical properties (i.e., heat distortion temperature and dimensional stability), electrical properties, fire retardancy and transparency, and furthermore, its durability under dry and moist heat and crazing resistance are noticeably improved over those of the known aromatic polyester copolymers. Therefore, the copolymer of this invention does not require an agent for improving its durability under dry and moist heat or an agent for improving its crazing resistance, and if such agent is used, only a very small amount of the agent is needed. To the inventors' surprise, the aromatic polyester copolymer according to this invention experiences less discoloring, foaming and decrease in the molecular weight even at considerably high temperatures. Although the exact reason for this phenomenon is yet to be identified its immediate effect is high moldability of the aromatic polyester copolymer according to this invention as compared with conventional aromatic polyester copolymers. Due to their high melt viscosity, general aromatic polyester copolymers are poor in moldability. If molding temperature is increased to reduce the melt viscosity, the polymer discolors, foams or loses its molecular weight. On the other hand, a blend of the copolymer with a polymer having low melt viscosity gives a molded product having low heat distortion temperature and impact characteristics.

When these facts are taken together, one can easily appreciate the merit of this invention. While the mechanism by which the effect of this invention is brought about has not as yet been completely unravelled, the fact that the aromatic polyester copolymer of this invention is less prone to increase the terminal carboxyl content upon heating than the conventional copolymer leads one to believe that the low terminal carboxyl content inhibits the occurrence of various reactions in a high temperature range thus increasing the heat stability of the aromatic polyester copolymer remarkably.

The aromatic polyester copolymer of this invention consists of about 10 to about 90 mol%, preferably from about 30 to 70 mol%, more preferably about 50 mol%, of the recurring unit of the formula (a) and about 90 to about 10 mol%, preferably from about 70 to 30 mol%, more preferably about 50 mol%, of the recurring unit of the formula (b).

The aromatic polyester copolymer of this invention has a logarithmic viscosity number of at least about 0.3, preferably from about 0.3 to 0.9, more preferably from about 0.4 to 0.8, as measured in a mixture of phenol and tetrachloroethane (4:6 in weight ratio) at a concentration of 1 g/100 cc and at 25° C. If the logarithmic viscosity number is less than about 0.3, the copolymer does not have satisfactory mechanical properties, and if it exceeds about 0.9, the melt viscosity of the copolymer is increased to make its molding difficult.

The aromatic polyester copolymer of this invention has a terminal carboxyl content of about 80 mol eq./ton or less, preferably about 50 mol eq./ton or less, more preferably about 30 mol eq./ton or less, particularly preferably about 10 mol eq./ton or less, and most preferably about 5 mol eq./ton or less. The intended effect of this invention is not provided by an aromatic polyester copolymer having a terminal carboxyl content higher than about 80 mol eq./ton.

One exemplary process for producing the aromatic polyester copolymer of this invention is as follows: a mixture of terephthaloyl dihalide and isophthaloyl dihalide (the molar ratio of the terephthalic acid to isophthalic acid being from 9:1 to 1:9) and a metal salt of a bisphenol of the formula:

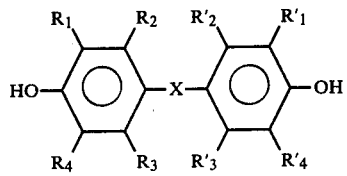

wherein —X— is a member selected from the group consisting of —O—, —S—, —SO$_2$—, —SO—, —CO—, an alkylene group containing 1 to 4 carbon atoms and an alkylidene group containing 1 to 4 carbon atoms; and R$_1$, R$_2$, R$_3$, R$_4$, R'$_1$, R'$_2$, R'$_3$ and R'$_4$ which may be the same or different each is a member selected from the group consisting of a hydrogen atom, a chlorine atom, a bromine atom and an alkyl group containing 1 to 4 carbon atoms; are subjected to interfacial polymerization for a number of hours in the presence of a molecular weight modifier.

Examples of suitable terephthaloyl or isophthaloyl dihalides are terephthaloyl or isophthaloyl dichlorides and dibromides.

Examples of suitable bisphenols of the above formula are 4,4'-dihydroxydiphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)-methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. Bisphenol A, 2,2-bis(4-hydroxyphenyl)propane, is most typical and is readily available, and accordingly, is most often used. Preferred metal salts of bisphenols are the sodium salts, the potassium salts thereof. The bisphenols may be used either alone or in a mixture of two or more.

A molecular weight modifier which can freely control the molecular weight is preferably used to provide an aromatic polyester copolymer having the desired logarithmic viscosity number. Exemplary molecular weight modifiers are monovalent phenolic compounds such as p-cumyl phenol, o-phenyl phenol, p-phenyl phenol, m-cresol, β-naphthol and p-tert-butyl phenol. The molecular weight modifier is generally used in an amount between 1 to 5 mol% based on the amount of phthaloyl halide used.

The above indicated monophenol derivatives are dissolved in an aqueous alkaline solution and then mixed with an aqueous alkaline solution (pH 11 or 12 or more) of the bisphenols illustrated above.

The molar ratio of the acid dihalide to bisphenol as the reactants for interfacial polymerization, their concentrations, polymerization solvent, polymerization temperature and pressure, the type of alkali used and its amount, the type of catalyst used and its amount and other polymerization conditions are selected properly from known conditions disclosed in, for example, U.S. Pat. No. 3,884,990 which is incorporated herein by reference.

To produce the aromatic polyester copolymer of this invention, polymerization must be performed for a several hours under suitable conditions (such as the conditions described in the above referenced U.S. Patent). For instance, a 5 to 15 wt% solution of a mixture of terephthaloyl halide and isophthaloyl halide in methylene chloride and a 5 to 15 wt% solution prepared by dissolving a bisphenol and a molecular weight modifier in an aqueous caustic soda solution containing 200 to 250 mol% of caustic soda based on the terminal hydroxyl content thereof are subjected to polymerization under vigorous stirring in the presence of a catalyst at 5° to 30° C. under atmospheric pressure, the molar ratio of the acid halide group of the acid halide to the total amount of the hydroxyl group of the bisphenol and the hydroxyl group of the molecular weight modifier being substantially 1:1, for a period which is preferably at least about 8 hours, more preferably at least 15 hours, and most preferably at least 20 hours.

It is common knowledge that the reaction occurring in interfacial polymerization is completed in a very short period of time, for instance, in J. Poly. Sci., 40 399 (1950) cited hereinabove as one example of interfacial polymerization, W. M. Eareckson teaches a polymerization period as short as 5 minutes. Japanese Patent Publication No. 1959/65 continues the polymerization for a maximum of 50 minutes, and U.S. Pat. No. 3,884,990 a period of from 1 to 2 hours. Therefore, it has been generally accepted that the reaction of interfacial polymerization is typically completed within one hour or so, and within 2 to 4 hours at a maximum. As a result of extensive studies on the relationship between the polymerization period and the physical properties of the aromatic polyester, it has been found that by extending the polymerization period preferably to at least about 8 hours, more preferably to at least 15 hours, and most preferably to at least 20 hours, the terminal carboxyl content of the resulting polymer is markedly reduced as compared with that obtained at short-period polymerizations, thus providing the copolymer with the various desired capabilities described hereinabove. A polymerization extended to longer than 100 hours is rather uneconomical because the investment in man-hours spent is not fully rewarded.

Generally, the terminal carboxyl content of a polymer is closely related to its molecular weight, and it decreases as the molecular weight increases following the progress of the polymerization reaction. However, the decrease in the terminal carboxyl content as a result of extended polymerization appears entirely of different kind than the decrease in the terminal carboxyl content as a result of increase in molecular chain. For example, as disclosed in Japanese patent application (OPI) No. 51095/73, if a suitable amount of orthophenylphenol is used as a molecular weight modifier for interfacial polymerization, the logarithmic viscosity number which is a parameter of the molecular weight, reaches an equilibrium in about 20 minutes. Continued measurement of the solution viscosity and polymerization time shows that the solution viscosity begins to decrease gradually after 3 to 4 hours of polymerization. However, the terminal carboxyl content continues to decrease even after the solution viscosity begins to decrease, and its rate of decrease begins to slow down after 8 hours of polymerization and it substantially reaches an equilibrium in about 20 hours. The cause of these phenomena has not been identified, but one thing that can be said for sure is that these phenomena suggest that the reaction occurring in the course of extended interfacial polymerization cannot be fully explained simply by a decrease in the terminal carboxy content that inevitably accompanies an increase in the molecular weight.

To carry out extended polymerization under strong stirring that is sustained from the beginning to the end means high energy cost, a strong likelihood of forming a creamy polymerization solution, and difficult separation of the polymer, and among other things, such sustained strong agitation is not essential to the purpose of this invention. The method that gives higher overall efficiency is to continue strong stirring (about 3 to 10 kw/m$^3$) for the first 30 minutes or 1 hour and to decrease the stirring force (to about 0.1 to 5 kw/m$^3$) thereafter.

Interfacial polymerization may be conducted batchwise or continuously, and in continuous polymerization, the polymerization time is expressed in terms of the average residence time of the polymer in the continuous polymerization vessel. The average residence time of the polymer in the continuous polymerization vessel is 10 hours or more, preferably 20 hours or more, most preferably 30 hours or more. The resulting polymer may be isolated and purified by various known methods.

A weather resisting agent or an antioxidant may also be incorporated in the aromatic copolyester of this invention as described in U.S. Pat. No. 3,884,990. Benzotriazole compounds, benzophenone compounds and phenolic compounds can be used for this purpose. Representative examples of antioxidants which can be used in the present invention include phenol compounds such as 2,6-di-tert-butyl-4-methylphenol, 2,4,6-tri-tert-butylphenol, etc., plasticizers, pigments, fire retardants, demolding agents and reinforced with glass fibers.

If desired, the aromatic copolyester of this invention may be used in combination with at least one polymer such as a polyalkylene terephthalate (e.g., polyethylene terephthalate or polybutylene terephthalate), a polyethylene hydroxybenzoate, a polycarbonate, polyethylene, polypropylene, a polyamide, a polyurethane, polystyrene, an ABS resin, an ethylene/vinyl acetate copolymer, a poly(acrylate ester), polytetrafluoroethylene, polymethyl methacrylate, and polyphenylene sulfide rubber depending on the particular end-use and the properties desired. Such additives can be added in an amount which does not markedly deteriorate the properties of the aromatic copolyester according to the present invention to, for example, improve moldability, prevent crazing, improve impact-resistance, improve abrasion-resistance, improve chemical-resistance, etc. The amount thereof added will vary depending upon the type of additives, but generally the amount thereof ranges from about 1 to about 10% by weight based on the weight of the aromatic copolyester.

A powder, chips and other forms of the aromatic polyester copolymer of this invention can be fabricated into various useful articles by press molding, injection molding, extrusion molding and other known plastic molding techniques. Exemplary molded articles include gears, bearings, various electrical parts, containers and others which are used in fields that require high-quality engineering plastics. Instead, the copolymer may be melt spun into fibers or bristles. The aromatic polyester copolymer of this invention is stable in viscosity and therefore has very high adaptability to the above-mentioned moldings. Films or fibers may be prepared from a solution of the copolymer in a low boiling solvent by removing the solvent.

The film thus produced is transparent, has good mechanical properties, absorbs little water or moisture, and has high electrical properties. The properties of the film can be improved remarkably by means of uniaxial or biaxial orientation, which is generally effected at 100° to 230° C. to advantage.

The resulting film may be used in a magnetic tape, pressure-sensitive tape, insulating tape, glass or metal laminated film, or an electrical part such as an insulating sheet. The aromatic polyester copolymer of this invention can also be used as wire coating or coating agents for articles processed by various printing methods.

This invention is now described in greater detail by reference to the following examples and comparative examples. The term "terminal carboxyl content" as used hereinabove and hereunder means the value determined by the following method:

Method of Determining the Terminal Carboxyl Content

A conical flask is filled with 25 ml of aniline, and 0.25 to 0.5 g of the polymer that has been ground to fine particles (about 2 mm in diameter) is accurately measured and placed in the flask, which is then heated in a 100° C. oil bath for about 15 minutes until the polymer dissolves. The solution is titrated with a 0.01 N solution of caustic potash in methanol, with phenolphthalein used as an indicator, until the colorless solution turns red. The same procedure is repeated for a polymer-free sample which is used as the blank and whose titer is substracted from that of the polymer-containing sample. All procedures are followed in a nitrogen stream. The following formula is used to determine the mol eq./ton:

$$\frac{(A - B) \times \frac{N}{100} \times F \times 10^3}{W} = \text{mol eq./ton}$$

A: titer of polymer-containing sample (cc)
B: titer of polyer-free sample (cc)
N: normality of caustic potash
F: factor of caustic potash
W: weight of polymer (g)

To explain the present invention in more detail the following examples and comparative examples are provided wherein all parts are by weight.

EXAMPLES 1 TO 5 AND COMPARATIVE EXAMPLES 1 AND 2

A jacketed vessel equipped with a stirrer was charged with 750 parts of water in which 12.6 parts of caustic soda and 0.3 part of hydrosulfite were first dissolved, then 34.2 parts of bisphenol A, 0.17 part of trimethylbenzyl ammonium chloride and 0.38 part of orthophenylphenol, and the temperature of the solution was adjusted to 10° C. A mixture of 15.2 parts of terephthaloyl dichloride and an equal amount of isophthaloyl dichloride was dissolved in 462 parts of methylene chloride, the resulting solution was adjusted to 10° C., and added to the aqueous solution of bisphenol A in caustic soda over a short period under vigorous stirring. The vigorous stirring continued for the first one hour of polymerization. Then, to prevent formation of a creamy polymerization solution, the stirring rate was reduced by half and the polymerization was continued until the total polymerization times become the periods indicated in Table 1. Thereafter, the polymerization solution was drawn from the vessel and allowed to stand, whereupon it rapidly separated into the methylene chloride phase and aqueous phase. Water was added to the organic phase, then diluted hydrochloric acid was added to render the organic phase neutral, it was washed with water under stirring, allowed to stand to separate the organic phase from water and washed with water under stirring. Such procedure was repeated five times. The degree of washing was checked by measuring the electrical conductivity of the aqueous phase and by forming a precipitate of silver chloride. To the thus-purified solution of aromatic polyester copolymer in methylene chloride was added a nearly equal amount of acetone to thereby precipitate and isolate the polymer. The isolated polymer was vacuum dried at 50 Torr, 120° C. for 10 hours to remove the solvent, and then the viscosity, terminal carboxyl content, ageing characteristics and other properties of the copolymer were determined.

As the test piece for determining the ageing characteristics, a cast film was prepared from a solution of polymer powder in methylene chloride. The results are indicated in Table 1 below. As is clearly understood from Table 1, the viscosity of the copolymer tended to decrease with polymerization time, but the terminal carboxyl content kept decreasing with time, and the lower the terminal carboxyl content was, the smaller the decrease in the polymer viscosity and the less colored the polymer after exposure to high temperature (170° C.) atmosphere.

conditions, moldings were also provided by being held in the cylinder at 380° C. for 10 minutes. All these moldings were checked for their viscosity, appearance, terminal carboxyl content and mechanical characteristics. They were also exposed to 170° C. dry atmosphere for

TABLE 1

| Example No. | Polymerization Time (hour) | Logarithmic Viscosity Number of the Polymer | Terminal Carboxyl Content of the Polymer (mol eq./ton) | Logarithmic Viscosity Number after Heating at 170° C. for 20 Days | Color after Heating at 170° C. for 20 Days |
|---|---|---|---|---|---|
| Comparative Example 1 | 1 | 0.661 | 134 | 0.452 | Dark brown |
| Comparative Example 2 | 2 | 0.658 | 108 | 0.457 | " |
| Example 1 | 10 | 0.644 | 58 | 0.523 | Brown |
| Example 2 | 16 | 0.638 | 35 | 0.558 | Light brown |
| Example 3 | 24 | 0.633 | 23 | 0.575 | Light Yellow |
| Example 4 | 48 | 0.636 | 19 | 0.571 | " |
| Example 5 | 100 | 0.625 | 5 | 0.590 | " |

EXAMPLES 6 TO 8 AND COMPARATIVE EXAMPLE 3

Polymers were prepared by repeating the procedure of Example 1 except that the polymerization continued for the periods indicated in Table 2 below. The polymers were then isolated, purified and vacuum dried in the same manner as Example 1. A powder of the resulting polymer was extruded from an extruder having a cylinder temperature of 330° C. to form chips which were then injection molded to form test pieces for tensile impact test in accordance with ASTM-1822. The injection molding was performed at a cylinder temperature of 350° C. and a mold temperature of 140° C. To check the heat stability of the polymer melt under field 40 days and to 80° C. saturated vapor atmosphere for 20 days, and subjected to determination of their capabilities designated in Table 2. The results are set forth in Table 2 from which one can understand that the aromatic polyester copolymer of this invention is highly stable to heat of molding as well as to ageing under dry and moist heat.

TABLE 2

| Test Items | Comparative Example 3 | Example 6 | Example 7 | Example 8 |
|---|---|---|---|---|
| Polymerization time (hrs.) | 1 | 20 | 30 | 100 |
| Polymer powder | | | | |
| Logarithmic viscosity number | 0.667 | 0.642 | 0.635 | 0.625 |
| Terminal carboxyl content (mol eq./ton) | 118 | 27 | 16 | 5 |
| Moldings before ageing | | | | |
| Molded under standard conditions (350° C., 30 sec.) | | | | |
| Logarithmic viscosity number | 0.603 | 0.615 | 0.621 | 0.620 |
| Terminal carboxyl content (mol eq./ton) | 154 | 31 | 22 | 10 |
| Tensile impact strength (kg/cm$^2$) | 335 | 353 | 340 | 350 |
| Molded under severe conditions (380° C., 10 min.) | | | | |
| Color | dark brown | light brown | light brown | light brown |
| Voids | many | none | none | none |
| Logarithmic viscosity number | 0.414 | 0.548 | 0.561 | 0.570 |
| Moldings after ageing | | | | |
| 170° C., 40 days | | | | |
| Color | black brown | light brown | light brown | light brown |
| Retention of tensile impact strength (%) | 0 | 75 | 90 | 95 |
| Carboxyl content (mol eq./ton) | 350 | 86 | 57 | 35 |
| 80° C., 100% RH, 20 days | | | | |
| Craze | yes | no | no | no |
| Retention of tensile impact strength (%) | 0 | 83 | 90 | 93 |
| Logarithmic viscosity number | 0.371 | 0.514 | 0.543 | 0.552 |
| Carboxyl content (mol eq./ton) | 290 | 80 | 49 | 26 |

EXAMPLES 9 TO 11 AND COMPARATIVE EXAMPLE 4

A jacketed vessel equipped with a stirrer was charged with 700 parts of water in which 17 parts of caustic soda, 22.57 parts of bisphenol A, 20 parts of 4,4'-dihydroxydiphenyl ether, 0.5 part of trimethylbenzyl ammonium chloride and 0.6 part of p-tert-butylphenol were dissolved, and the temperature of the solution was adjusted to 10° C. A mixture of 16.24 parts of terephthaloyl dichloride and 24.36 parts of isophthaloyl dichloride was dissolved in 450 parts of methylene chloride, the resulting solution was adjusted to 10° C., and added to the aqueous solution of diphenol in caustic soda over a short period under vigorous stirring. The vigorous stirring continued for the first one hour of polymerization. Then, the stirring rate was reduced by half and the polymerization was continued for the periods indicated in Table 3. After the polymerization, the polymer powder was obtained in the same manner as in Example 1.

The resulting polymer powder was molded by the same procedure as in Example 6. The properties of the resulting moldings were measured by the same procedure as in Example 6 and the results are shown in Table 3 below.

hydrogen atom, a chlorine atom, a bromine atom and an alkyl group containing 1 to 4 carbon atoms; and about 90 to about 10 mol% of a recurring unit of the formula (b):

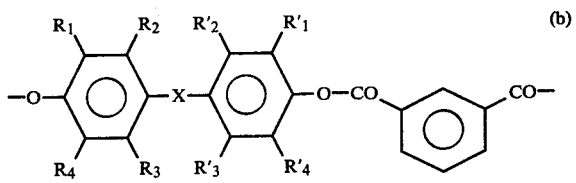

wherein —X—, $R_1$, $R_2$, $R_3$, $R_4$, $R'_1$, $R'_2$, $R'_3$, and $R'_4$ have the definition in formula (a); and having a logarithmic viscosity number of about at least 0.3 as measured in a mixture of phenol and tetrachloroethane (6:4 in weight ratio) at a concentration of 1 g/100 cc at 25° C. and a terminal carboxyl content of 16 mol eq./ton or less.

TABLE 3

| Test Items | Comparative Example 4 | Example 9 | Example 10 | Example 11 |
|---|---|---|---|---|
| Polymerization time (hrs.) | 1 | 25 | 50 | 100 |
| Polymer powder | | | | |
| Logarithmic viscosity number | 0.68 | 0.65 | 0.64 | 0.63 |
| Terminal carboxyl content (mol eq./ton) | 110 | 20 | 17 | 5 |
| Moldings | | | | |
| Molded under standard conditions (350° C., 30 sec.) | | | | |
| Color | dark brown | light brown | light brown | light brown |
| Logarithmic viscosity number | 0.60 | 0.60 | 0.61 | 0.61 |
| Terminal carboxyl content (mol eq./ton) | 160 | 35 | 24 | 12 |
| Tensile impact strength (kg/cm²) | 350 | 340 | 340 | 330 |
| Molded under severe conditions (380° C., 10 min.) | | | | |
| Color | black-brown | light brown | light brown | light brown |
| Voids | many | none | none | none |
| Logarithmic viscosity number | 0.45 | 0.50 | 0.51 | 0.53 |
| Tensile impact strength (kg/cm²) | 10 | 70 | 110 | 110 |
| Terminal carboxyl content (mol eq./ton) | 340 | 73 | 55 | 45 |

While the invention has been described in detail and with reference to specific embodiments thereof, it will be apparent to one skilled in the art that various changes and modifications can be made therein without departing from the spirit and scope thereof.

What is claimed is:

1. An aromatic polyester copolymer consisting essentially of about 10 to about 90 mol% of a recurring unit of the formula (a):

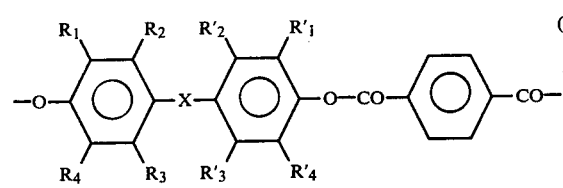

wherein —X— is selected from the group consisting of —O—, —S—, —SO$_2$—, —SO—, —CO—, an alkylene group containing 1 to 4 carbon atoms and an alkylidene group containing 1 to 4 carbon atoms; and $R_1$, $R_2$, $R_3$, $R_4$, $R'_1$, $R'_2$, $R'_3$ and $R'_4$, which are the same or different, each is selected from the group consisting of a 2. The aromatic polyester copolymer of claim 1, which has a terminal carboxyl content of about 10 mol eq./ton or less.

3. The aromatic polyester copolymer of claim 1, which has a terminal carboxyl content of about 5 mol eq./ton or less.

4. The aromatic polyester copolymer of claim 1, which consists of 10 to 90 mol% of a recurring unit of the formula:

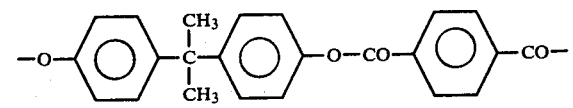

and 90 to 10 mol% of a recurring unit of the formula:

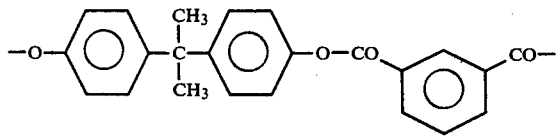

5. The aromatic polyester copolymer of claim 1, wherein said copolymer comprises about 30 to 70 mol% of the recurring unit of the formula (a) and about 70 to 30 mol% of the recurring unit of the formula (b).

6. The aromatic polyester copolymer of claim 1, wherein said repeating unit of the formula (a) and said repeating unit of the formula (b) are present in said copolymer in a mol ratio of about 1:1.

7. The aromatic polyester copolymer of claim 1, wherein said copolymer has a logarithmic viscosity of about 0.4 to 0.8.

8. A polymeric composition comprising the aromatic polyester copolymer of claim 1 and an additive.

9. A film prepared from the aromatic polyester copolymer of claim 1.

10. A film prepared from the composition of claim 8, wherein said film is uniaxially or biaxially oriented.

11. A fiber prepared from the aromatic polyester copolymer of claim 1.

12. A molded article prepared from the aromatic polyester copolymer of claim 1.

* * * * *